United States Patent
Roach et al.

(10) Patent No.: US 9,623,892 B2
(45) Date of Patent: Apr. 18, 2017

(54) APPARATUS FOR HANDLING CYLINDRICAL OBJECTS AND METHOD OF UTILIZING THE SAME

(71) Applicant: Ergo-Safe, Inc., Bakersfield, CA (US)

(72) Inventors: Dwayne Roach, Bakersfield, CA (US); Michael Blackwood, Bakersfield, CA (US)

(73) Assignee: ERGO-SAFE, INC., Bakersfield, CA (US)

( * ) Notice: Subject to any disclaimer, the term of this patent is extended or adjusted under 35 U.S.C. 154(b) by 0 days.

(21) Appl. No.: 14/831,609

(22) Filed: Aug. 20, 2015

(65) Prior Publication Data

US 2017/0050657 A1 Feb. 23, 2017

(51) Int. Cl.
| | |
|---|---|
| *B66F 9/06* | (2006.01) |
| *B62B 3/10* | (2006.01) |
| *B62B 3/04* | (2006.01) |
| *B62B 3/08* | (2006.01) |

(52) U.S. Cl.
CPC ............... *B62B 3/104* (2013.01); *B62B 3/04* (2013.01); *B62B 3/08* (2013.01)

(58) Field of Classification Search
CPC .............. B62B 3/04; B62B 3/08; B62B 3/104
See application file for complete search history.

(56) References Cited

U.S. PATENT DOCUMENTS

| | | | | |
|---|---|---|---|---|
| 3,981,511 A | * | 9/1976 | Foster | B62B 5/049 211/150 |
| 6,368,048 B2 | * | 4/2002 | Womble | B62B 3/104 414/590 |
| 2004/0076501 A1 | * | 4/2004 | McGill | B62B 3/008 414/607 |
| 2007/0292247 A1 | * | 12/2007 | Wilson | B62B 3/04 414/331.06 |
| 2007/0292249 A1 | * | 12/2007 | Wilson | B62B 3/04 414/444 |

* cited by examiner

*Primary Examiner* — Patrick J Maestri
(74) *Attorney, Agent, or Firm* — James M. Duncan, Esq.; Klein DeNatale Goldner (57) ABSTRACT

An apparatus provides a means by which a heavy cylindrical object, such as a gas cylinder, may be manually moved by a single person from a vertical standing position in a first location to a second location and, if desired, raised and placed on a storage shelf or platform. The apparatus has clamping mechanism which clamps around the girth of the cylindrical object. Once the cylindrical object is secured within the clamping mechanism, a manual force applied to one end of the cylindrical causes the clamping mechanism and the cylindrical object to pivot, raising the bottom of the cylindrical object from the surface upon which it stands. The apparatus, having ground engaging wheels, may then be pushed to the second location.

16 Claims, 9 Drawing Sheets

APPARATUS FOR HANDLING CYLINDRICAL OBJECTS AND METHOD OF UTILIZING THE SAME

BACKGROUND OF THE INVENTION

The present invention provides an apparatus and method for handling cylindrical objects. Such objects may be very heavy, bulky, and awkward to handle with the known manually-operated apparatus. Such cylindrical objects include cylindrical tanks which hold gas and liquids. Such cylindrical objects may further include other cylindrical objects such as artillery rounds, pipe segments, and similar objects which are cylindrical in shape, generally heavy and awkward to handle.

By way of example, tanks utilized for storing and transporting compressed gas are routinely transported by welders to job locations. Regulations of the Occupational Safety and Health Administration require that compressed gas cylinders shall be secured in an upright (i.e., vertical) position. However, if supported and held together by a structurally adequate means, gas cylinders may be transported horizontally.

Maneuvering cylindrical objects presents difficulties, particularly when it is desired to move an object back and forth between a standing position on a floor or other horizontal surface and a horizontal position on a raised shelf or rack. Many times, cylindrical tanks are moved by an individual by tilting the tank such that a small edge of the bottom of the tank engages the ground surface, and then "rolling" the tank along that edge, with the tank precariously leaning off vertical. When this method is employed, it is not uncommon for the tank to tilt too far and fall to the ground, presenting a hazard to personnel and to equipment. Raising a cylindrical object, such as a compressed gas tank, to place it on a shelf, rack or vehicle presents additional risks of back injury or the cylindrical object falling and causing injury to personnel and/or property.

Devices exist, such as wheeled hand carts having straps for maintaining the cylindrical object in attachment to the hand cart, which facilitate movement of the cylindrical object along the ground or upon a floor surface. Some devices further provide relatively elaborate or complicated mechanisms for lifting the cylindrical object. However, embodiments of the presently disclosed invention provide a secured attachment to the hand cart for movement along the ground or upon a floor surface, and also provide a relatively simply manually operated mechanism which provides a mechanical advantage for vertical movement of a cylindrical object back and forth between a vertical position on a horizontal surface, such as a floor, and a horizontal position on a shelf or rack.

SUMMARY OF THE INVENTION

An embodiment of the disclosed apparatus for handling cylindrical objects has a base having a front and a back, with the front having ground engaging front wheels and the back having ground engaging back wheels. A vertical tube extends upwardly from the base. A handle member may also extend upwardly from the base. A slide bar is partially inserted into the vertical tube, where the slide bar, unless otherwise locked in position, is free to slide in and out of the vertical tube. In addition to the portion of the slide bar inserted into the vertical tube, the slide bar has an upward end extending outside of the vertical tube. The slide bar has a face which may face an inside wall of the vertical tube as the slide bar is inserted and withdrawn from the vertical tube. An embodiment of the disclosed apparatus further comprises an engagement bracket which is pivotally attached to the upward end of the slide bar. The engagement bracket has an openable circular band with a manually operated closure for opening and closing the circular band. When the circular band is in the open position, a cylindrical object may be received within the circular band. The circular band also has a closed position, in which the manually operated closure is actuated and the circular band circumferentially grasps the cylindrical object.

The engagement bracket may pivot from between a horizontal position to a non-horizontal position. In the horizontal position, the circular band may receive the cylindrical object, including when the cylindrical object is standing in a vertical position upon a horizontal surface. The engagement bracket may be manually pivoted, with a cylindrical object grasped within the circular band, into the non-horizontal position. In pivoting the cylindrical object, a user may utilize the length of the cylindrical object to achieve a mechanical advantage. For example, once a gas storage cylinder is clamped within the circular band, a user my push down on the top of the cylinder to cause the engagement bracket to pivot, thereby lifting the bottom of the cylinder off of the floor upon which it was standing.

Embodiments of the invention may also have a locking mechanism which selectively locks the slide bar into a locking engagement with the vertical tube. In other words, once the locking mechanism is engaged, the slide bar is locked into position with respect to the vertical tube. The locking mechanism may include a spring-loaded pin which automatically engages an aperture of the slide bar as the aperture slides past the pin. With this configuration, and with a slide bar having a plurality of spaced-apart apertures, a user may simply lift the slide bar and the locking mechanism will engage the next aperture which passes the pin. The locking mechanism may include an actuation lever which releases the slide bar from a locking engagement with the vertical tube. The actuation lever may include a foot lever which allows the user to disengage the locking mechanism by pushing down on the foot lever.

Embodiments of the invention also include a method, employing an embodiment of the apparatus, of manually placing a cylindrical object onto a horizontal storage shelf, where the cylindrical object has an initial vertical position with the bottom disposed on a horizontal surface. By way of example, this method provides a way of engaging a gas cylinder standing in a vertical position on a floor, picking up the cylinder and transporting it, and raising the gas cylinder and placing it in a horizontal position on a shelf, rack or vehicle.

DETAILED DESCRIPTION OF THE INVENTION

Referring now to the figures, an embodiment of the disclosed apparatus for handling cylindrical objects 10 ("apparatus") is depicted in various views. For purposes of this disclosure, directional terms "front", "back", "forward", "rearward", "upward", "downward", "outside", "inside", "vertical", "horizontal", "outwardly" and "inwardly" are made with respect to the orientation of various structures as those structures are depicted in the figures. However, those directional terms are not intended to describe or limit the position of those structures in space or in all applications. In addition, for purposes of this disclosure, the terms "floor" and "ground" are used in the most general sense, and include any surface, such as a floor, deck, platform, stage, dock, etc., upon which the described apparatus is utilized.

Figure 2:
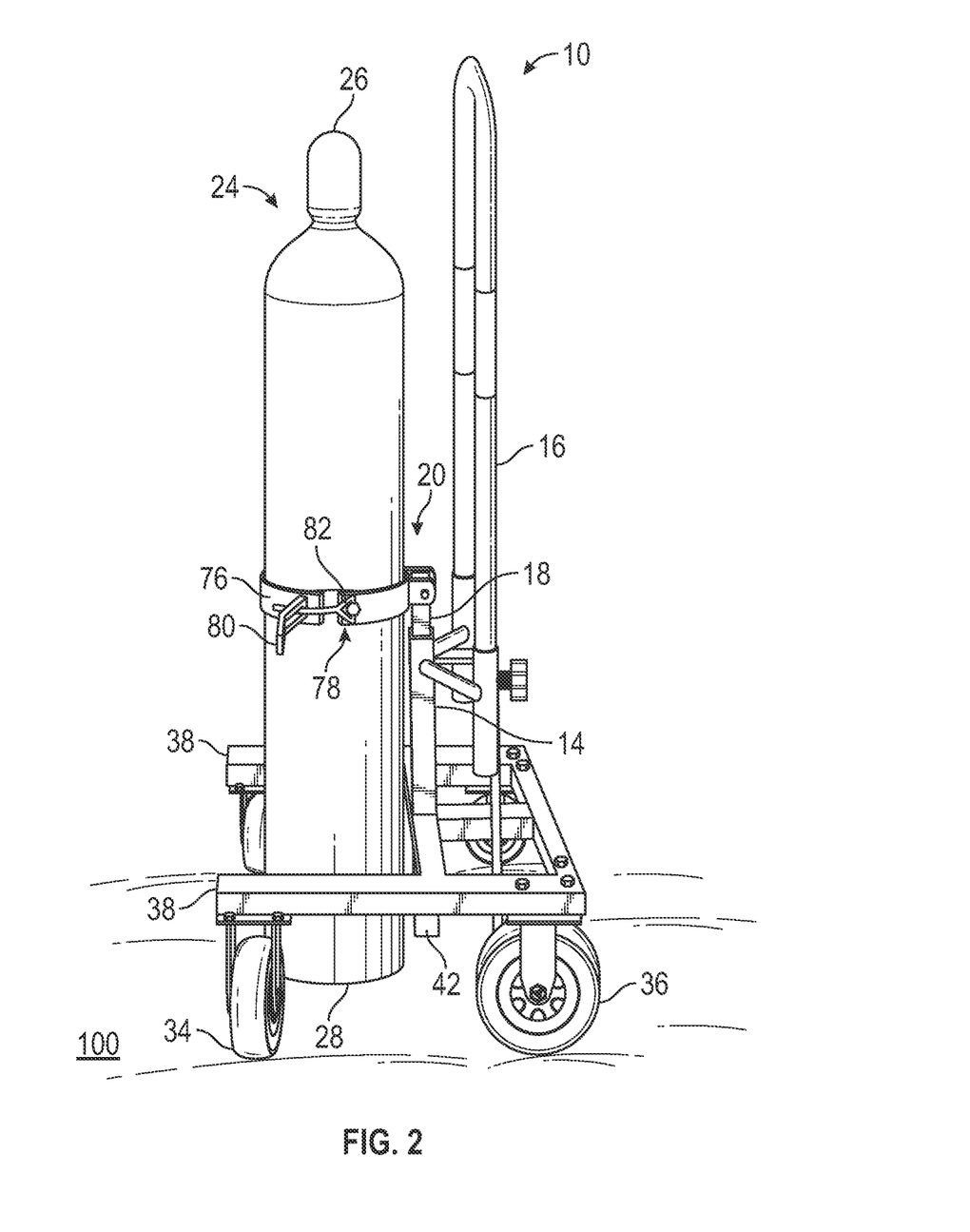
FIG. 2 depicts a side view of an embodiment of the apparatus which is engaging a vertically standing gas storage cylinder.

One embodiment of the apparatus 10 has a base 12, a vertical tube 14 and a handle member 16 extending upwardly from the base 12, a slide bar 18 slidingly inserted into the vertical tube 14, an engagement bracket 20 pivotally attached to the slide bar 18, and a locking mechanism 22 which selectively locks the slide bar 16 into locking engagement with the vertical tube 14. FIGS. 2, 4-6, and 8 depict an embodiment of the apparatus 10 manipulating a cylindrical object, in this case a gas cylinder 24. The gas cylinder 24 has a top 26 and a bottom 28. As shown in FIG. 2, the gas cylinder 24 may have an initial resting position in which the gas cylinder is in a vertical position with bottom 28 disposed on a generally horizontal surface such as floor 100.

Figure 7:
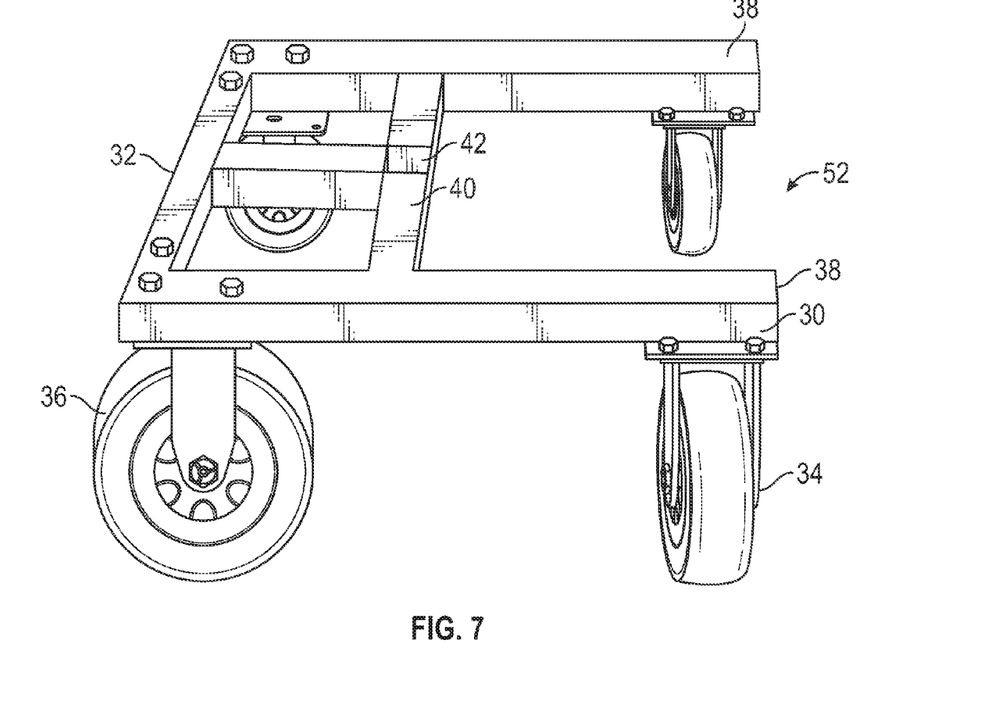
FIG. 7 shows an embodiment of a wheeled base removed from an embodiment of the invention.
Figure 12:
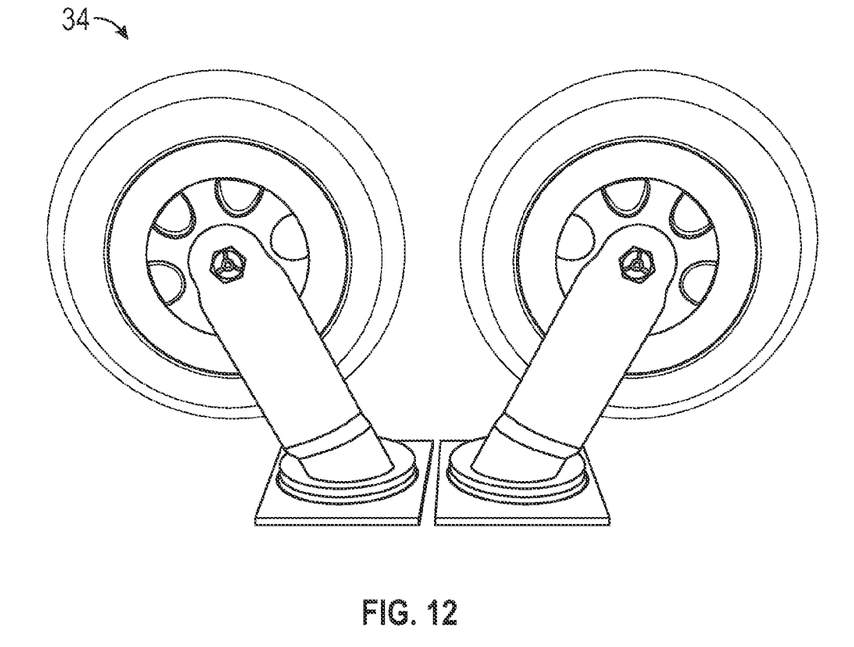
FIG. 12 depicts embodiments of articulating wheels which may be utilize on the front of an embodiment of the invention.
Figure 13:
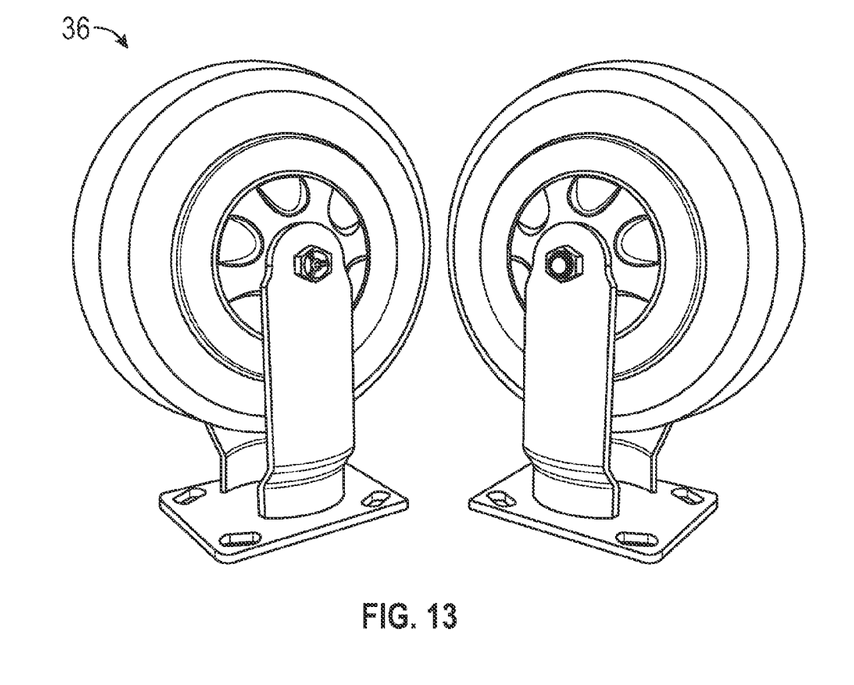
FIG. 13 depicts embodiments of non-articulating wheels which may be utilize on the back of an embodiment of the invention.

As best shown in FIG. 7, base 12 has a front 30 and a back 32. Front 30 may have articulating ground engaging wheels 34 attached to the front, and back 32 may have non-articulating ground engaging wheels 36 which are shown in greater detail in FIGS. 12-13. The inventors herein have found that the use of non-articulating wheels 36 on the back 32 provides better handling and greater stability of the apparatus 10 when the apparatus 10 is used to transport and manipulate a heavy cylindrical object, such as a gas cylinder 24. Base 12 may be fabricated from steel square tubing and is configured to have a parallel member construction at the front 30 defining an opening to accept a standing cylindrical object between the members 38 as shown in FIG. 2.

Figure 3:
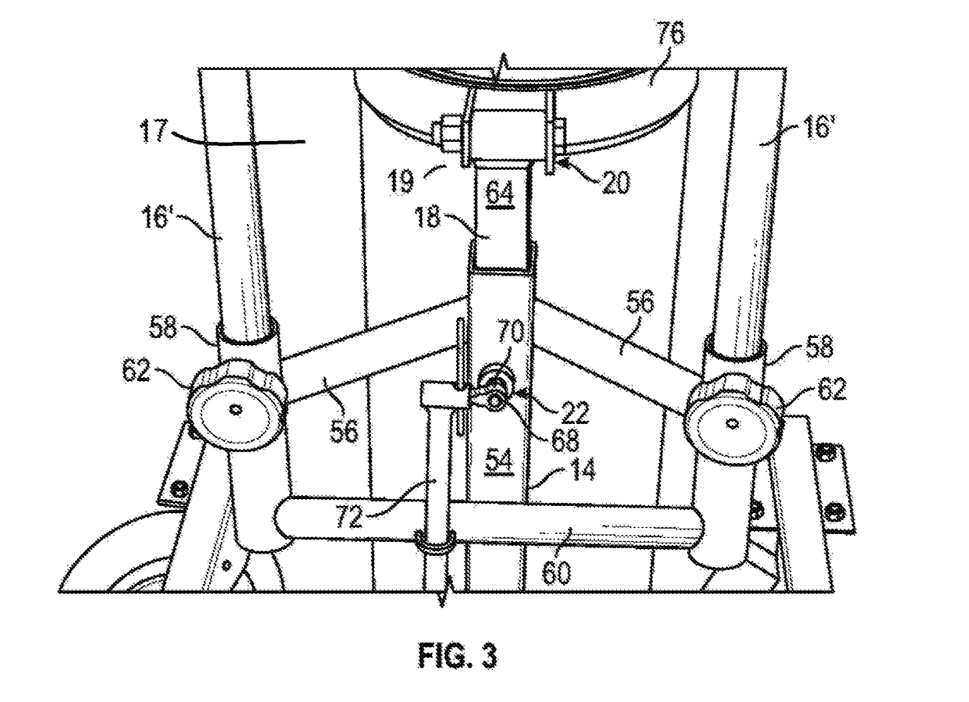
FIG. 3 depicts a close-up view of an embodiment of a locking mechanism which secures the position of the slide bar within the vertical post.
Figure 4:
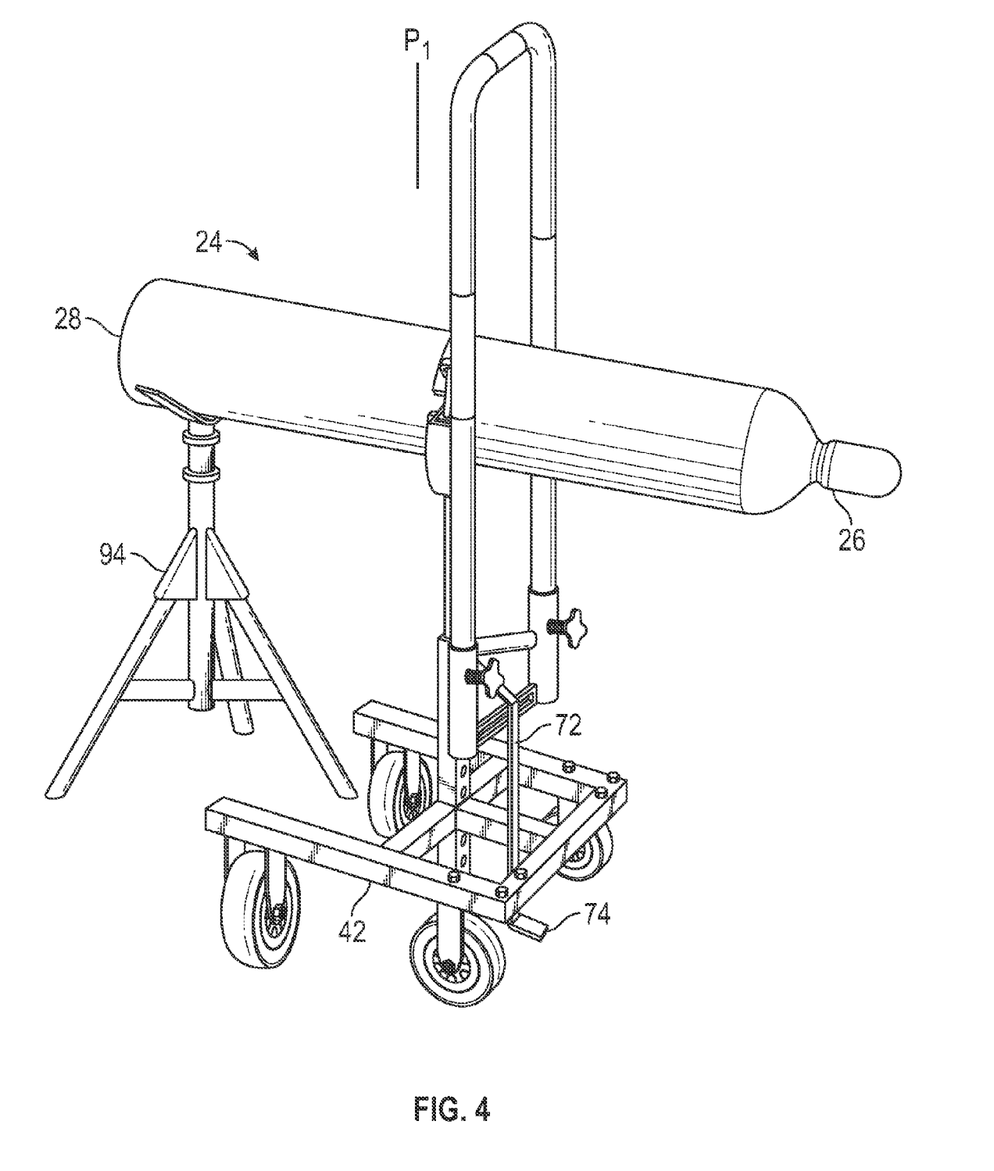
FIG. 4 depicts an embodiment of the apparatus in which the gas storage cylinder has been pivoted within the device and the bottom of the gas storage cylinder supported by a support.
Figure 5:
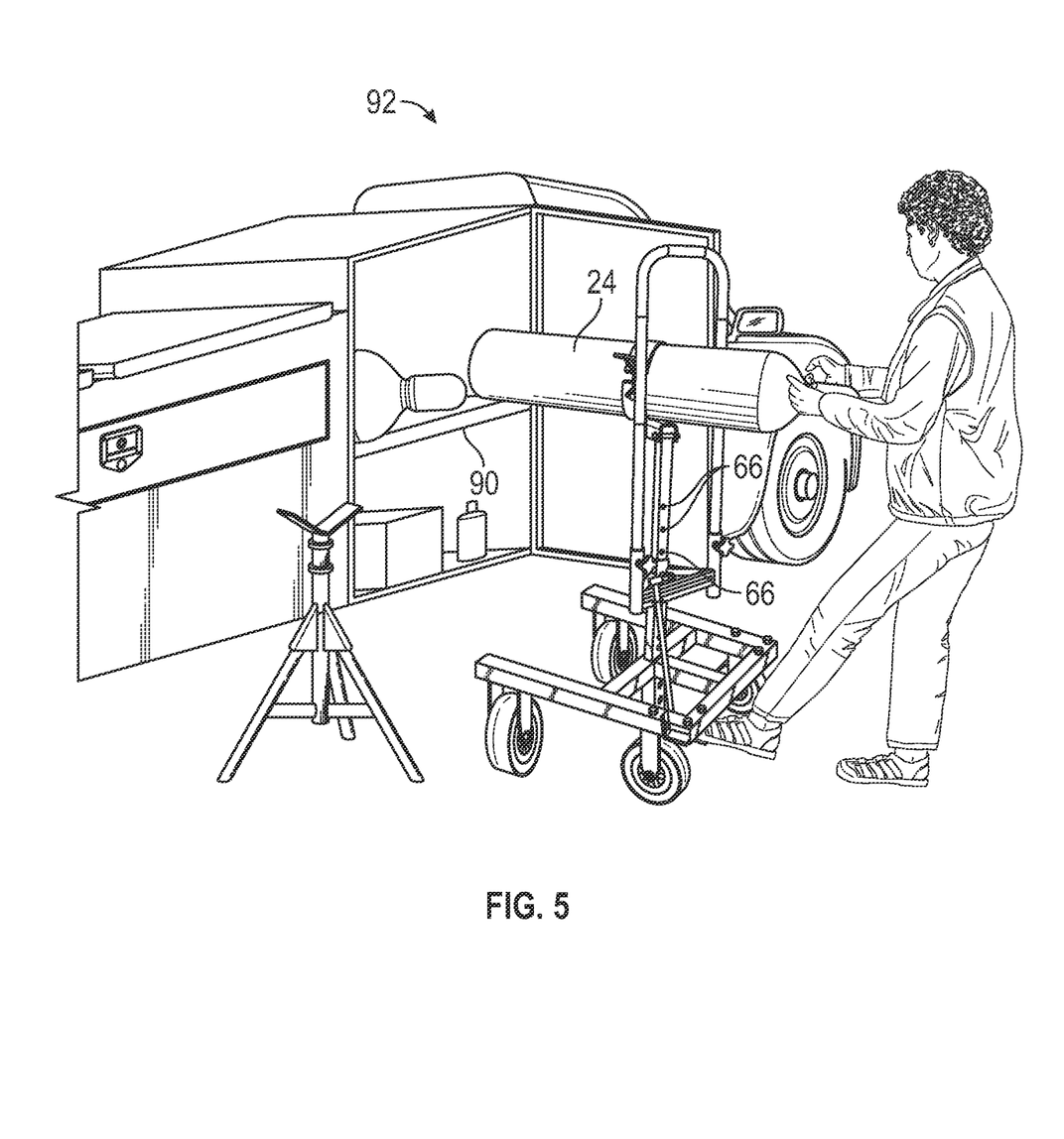
FIG. 5 depicts the placement of the gas storage cylinder into a storage compartment of a vehicle.
Figure 6:
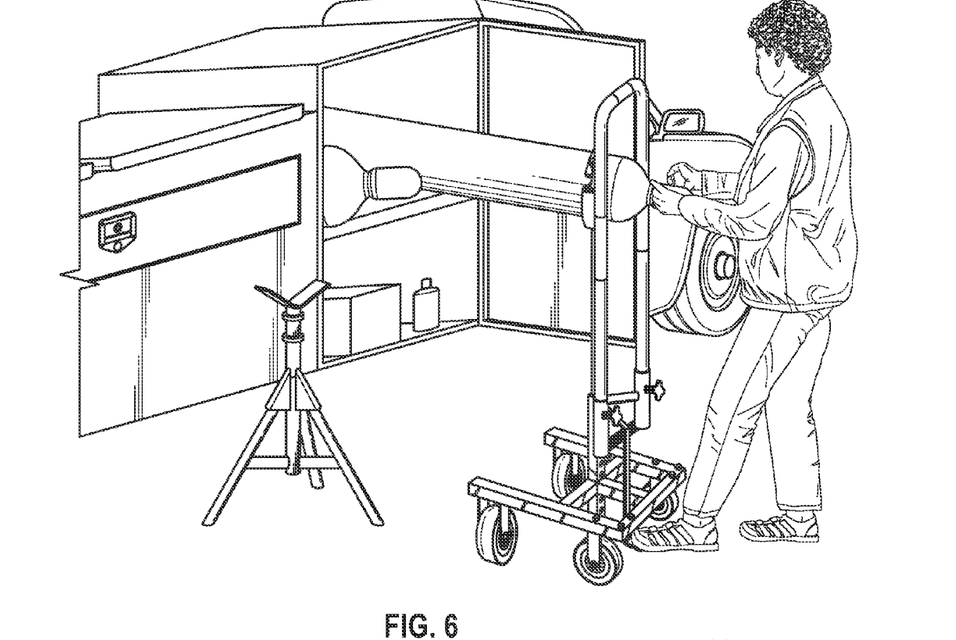
FIG. 6 depicts the placement of the gas storage cylinder into a storage compartment of a vehicle.
Figure 8:
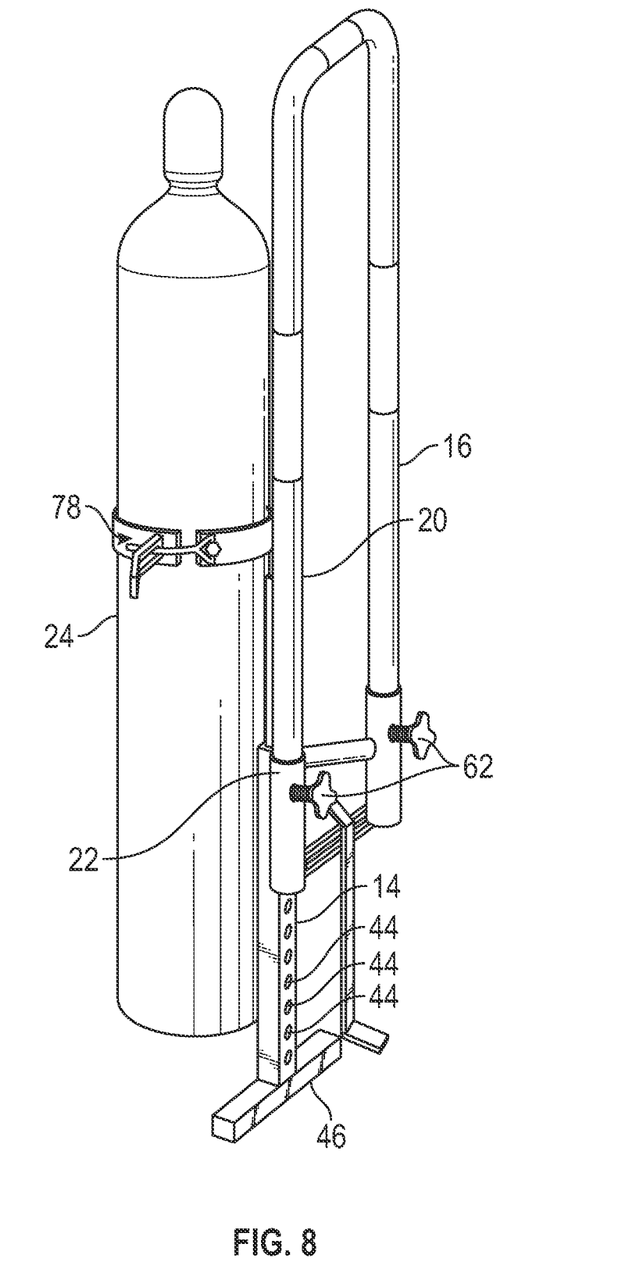
FIG. 8 depicts an embodiment of the apparatus clamped about a gas cylinder, where the wheeled base has been removed and replaced with a tee-stand.
Figure 9:
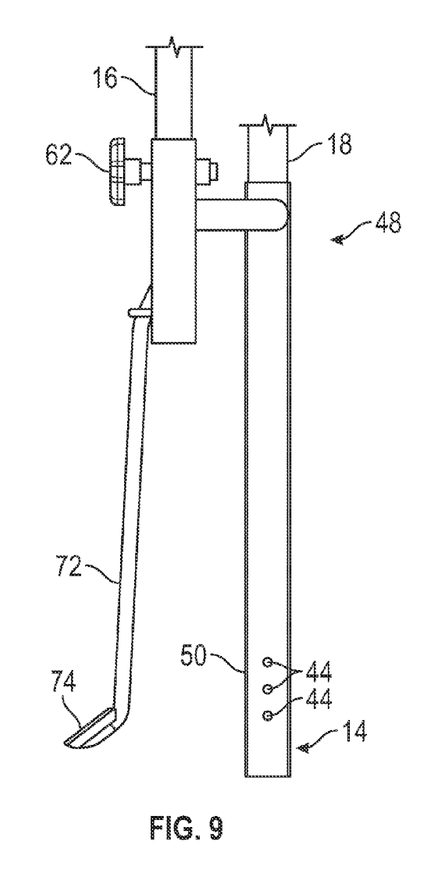
FIG. 9 shows a side view of a lever for disengaging the locking mechanism, and partial views of the slide bar and vertical tube.
Figure 10:
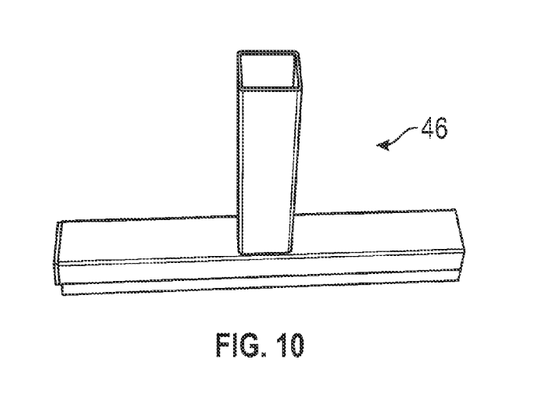
FIG. 10 depicts an embodiment of a tee-base separated from an embodiment of the invention.

Base 12 may also have a cross-member 40 which is utilized to support vertical tube 14. Sleeve 42 extends downwardly from cross-member 40. Vertical tube 14 may be inserted inside sleeve 42 and locked into place with a pin inserted through an aperture in sleeve 42 into corresponding apertures 44 in vertical tube 14. This configuration allows vertical tube 14 and attachments to the vertical tube to be removed as a single unit 48 from base 12. As indicated in FIGS. 8-9, this single unit 48 may comprise the vertical tube 14, the handle member 16, the slide bar 18, engagement bracket 20, and locking mechanism 22. The lower portion 50 of vertical tube 14 may then be inserted into tee-stand 46 and utilized to support a cylindrical object, such as gas cylinder 24 in a standing position as shown in FIG. 8. Base 12 and its components, as shown in FIG. 7, may be considered as a separate unit 52. As shown in FIG. 3, handle member 16 may have a parallel rail configuration having a first rail 16' and a second rail 16' defining an opening 17 there between, where the height of the handle member 16 can be adjusted up and down by loosening and tightening threaded lock pins 62. When the gas cylinder 24 is loaded onto the apparatus in the vertical position and locked into the engagement bracket 20, the articulating head 19 allows the gas cylinder 24 to be tilted 90 degrees or more into a horizontal position so that the cylinder may extend into the opening 17 defined between and through the parallel rails 16' of handle member 16. This configuration allows the gas cylinder to be positioned as shown in FIGS. 4-6 thereby balancing the load on base 42 and allowing the safe movement of the gas cylinder 24 onto a horizontal surface with minimal effort.

Considering again the embodiment which comprises single unit 48 and separate unit 52 attached together, vertical tube 14 extends upwardly from base 12. As best shown in FIG. 3, vertical tube 14, which may be fabricated from square tubing, may have an outwardly oriented face 54. Face 54 may comprise a threaded aperture which is utilized for attachment of locking mechanism 22 which may be threaded into a threaded aperture with threads 100. Vertical tube 14 may further have one or more support members 56 which extend outwardly. Support members 56 may have sleeve members 58 attached to the support members. Handle member 16 may comprise a pair of parallel tube members 16' with each tube member inserted through the sleeve members 58. Cross member 60 may extend between sleeve members 58 for additional support and for providing a support for actuation lever 72. Threaded lock pins 62 may be utilized to lock the tube members 16' in place, but allow for adjustment as necessary.

Slide bar 18 may be fabricated from square tubing. It will be sized such that at least a portion of the slide bar 18 is slidingly insertable into vertical tube 14. Slide bar 18 has a face 64 which may have a plurality of spaced-apart apertures 66 as shown in FIG. 5. Apertures 66 are sized and configured such that any one of the apertures may align with the pin 98 which is utilized by locking mechanism 22 as the slide bar 18 is slid inside of vertical tube 14.

Figure 11:
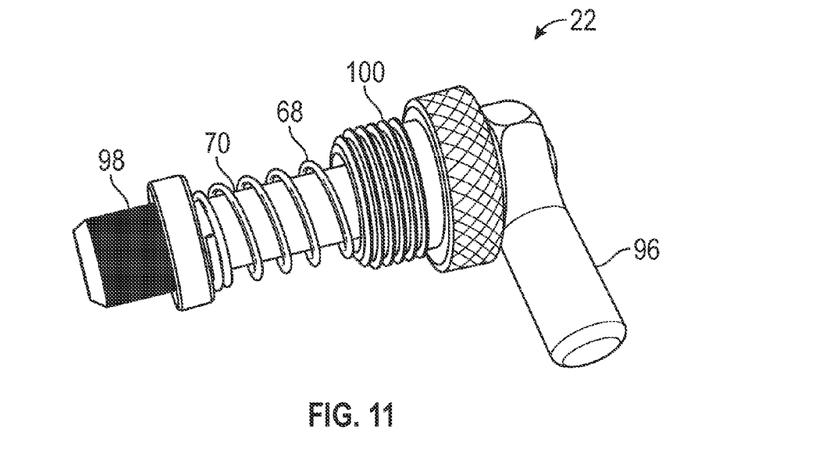
FIG. 11 depicts an embodiment of a locking mechanism which may be utilized in an embodiment of the invention.

Locking mechanism 22, an embodiment of which is shown in greater detail in FIG. 11, may comprise a pin assembly 68 having a spring 70 which biases pin 98 of the pin assembly 68 into a selected aperture of the plurality of spaced-apart apertures 66. Locking mechanism 22 may further have an actuation lever 72 which is attached to arm 96 of the pin assembly 68. When actuation lever 72 is actuated, it causes the pin 98 of the pin assembly 68 to retract from the aperture in which it had previously been inserted, allowing the slide bar to freely slide within vertical tube 14. Actuation lever 72 may terminate with a foot lever 74. As indicated in FIG. 5, foot lever 74 allows a user to raise or lower slide bar 18 by lifting or lowering cylinder 24 while disengaging the locking mechanism 22 by depressing foot lever 74.

Figure 1:
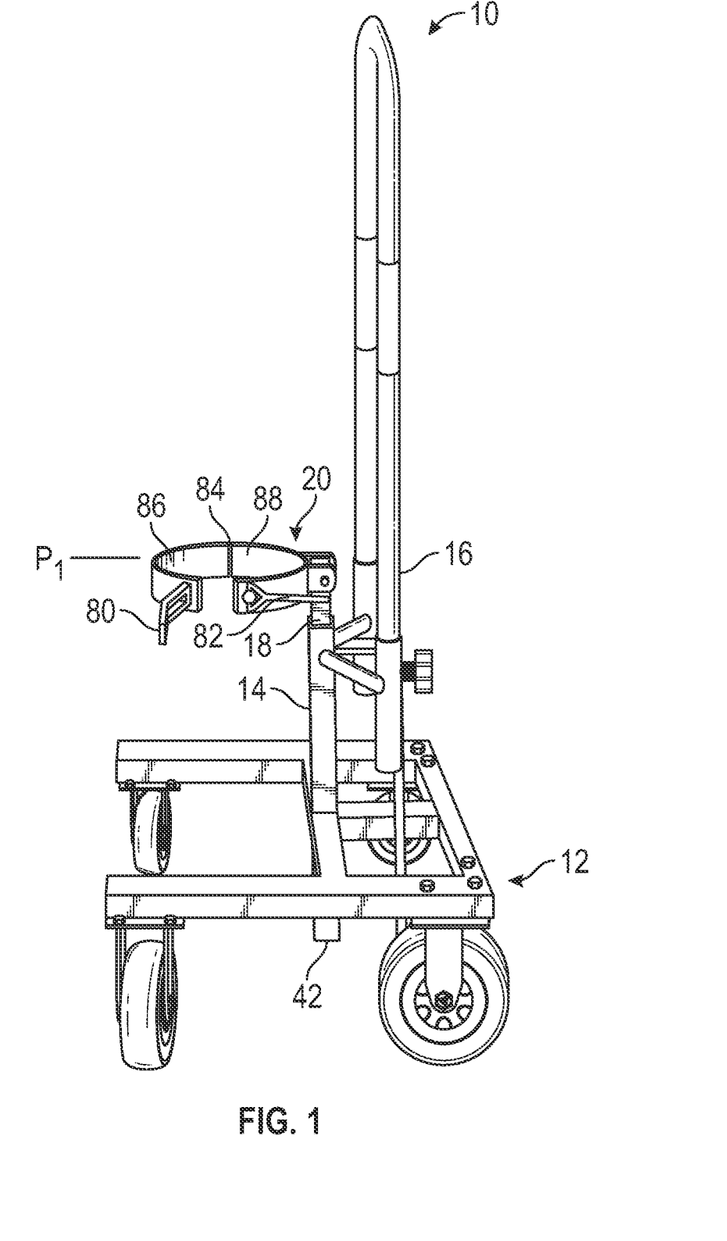
FIG. 1 depicts a side view of an embodiment of the apparatus for handling cylindrical objects.

Engagement bracket 20 is pivotally attached to the upward end of slide bar 18. Engagement bracket 20 comprises an openable circular band 76 which has a manually operated closure mechanism 78. Openable circular band 76 defines an opening within plane surface $P_1$ as shown in FIG. 1, where plane surface $P_1$ is generally parallel to a horizontal ground surface 100. When the openable circular band 76 is pivoted to this position, it may be positioned about a cylinder 24. Once a cylinder 24 is received within the openable circular band and the closure mechanism 78 closed to lock the cylinder into the circular band 76, the openable circular band may be pivoted to a second position where the plane surface $P_1$ is perpendicular to the horizontal ground surface as shown in FIG. 4.

Manually operated closure mechanism 78 may be any of a number of known latch devices which pulls tension into the band as the latch is actuated. For example manually operated closure mechanism 78 may comprise a latch member 80 having a latch attached to one end of the circular band 76 and a keeper member 82 attached to the other end. Openable circular band 76 may also have a hinged joint 84 to facilitate the operation of the band. In one embodiment, openable circular band 76 may comprise a first arc member 86 and a second arc member 88 which are joined at hinged joint 84, where the first arc member and the second arc member generally define a circle.

FIGS. 2 and 4-6 generally depict a method using the apparatus 10 for moving a cylindrical object, such as a gas cylinder 24, from a first position to a second position. Such second position may include placement of the cylindrical object onto a horizontal storage shelf 90 such as may be in a vehicle 92 or otherwise located. The term "horizontal storage shelf" as used herein is defined as any surface upon which a cylindrical object may be positioned in a generally horizontal orientation for storage, transport, repair, or use. The starting position of the cylindrical object, such as gas cylinder 24, is vertical with the bottom 28 disposed on a horizontal surface, such as a floor 30 as generally shown in FIG. 2. The apparatus 10 is pushed up to the cylindrical object, such that the cylindrical object is received between the members 38 as shown in FIG. 2. The openable circular band 76 of the apparatus 10 is positioned about the cylindrical object and the manually actuated closure mechanism 78 is actuated by engaging keeper member 82 with latch 80 and closing the handle. When the manually actuated closure mechanism is actuated, tension is applied to open circular band 76 and it circumferentially grasps the cylindrical object and is locked about it.

Once the cylindrical object is circumferentially grasped by the circular band 76, the user pushes down on the top 26 of the cylindrical object which, by utilization of the leverage provided by the length of the cylindrical object above the pivot point, causes the engagement bracket 20 to pivot thereby raising the bottom 28 of the cylindrical object from the floor 30. Once the bottom 28 has been raised from the floor 30, the cylindrical object may be moved by pushing the apparatus. It is to be appreciated that the present invention does not require any lifting of the cylindrical object to load it onto the apparatus 10, and once the cylindrical object is moved to the desired location, the user may allow the cylindrical object to resume a vertical position with the bottom 28 of the cylindrical object firmly positioned on the floor, or to raise the cylindrical object to an approximate horizontal orientation and place bottom 28 on support member 94 as shown in FIG. 4.

Once the cylindrical object 24 is in an approximate horizontal position with the bottom 28 supported by support member 94 as shown in FIG. 4, the user may lift up on the top 26 of the cylindrical object with the locking mechanism 22 disengaged, causing the slide bar 18 to be raised within the vertical tube 14 until the cylindrical object is a small distance above a horizontal storage shelf 90, at which point the locking mechanism is reengaged to secure the slide bar 18 within the vertical tube 14. At this point, the apparatus 10 may be pushed until the cylindrical object 24 is sufficiently supported by the horizontal storage shelf 90. The user may then release the manually actuated closure mechanism 78 and push the cylindrical object 24 as required to place the cylindrical object entirely upon the horizontal storage shelf 90.

A cylindrical object may be removed from a horizontal storage shelf 90 and placed in a vertical position on a floor 30 by reversing the steps described above.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

References to approximations are made throughout this specification, such as by use of one or more of the terms "about," "approximately," "substantially," and "generally." For each such reference, it is to be understood that, in some embodiments, the value, feature, or characteristic may be specified without approximation. For example, where such a qualifier is used, the terms includes within its scope the qualified word in the absence of the qualifier.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment. Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any embodiment require every feature shown in a particular drawing.

Unless otherwise noted, the terms "a" or "an" are to be construed as meaning "at least one of." In addition, for ease of use, the words "including" and "having" are interchangeable with and have the same meaning as the word "comprising." Recitation of the term "first" with respect to a feature or element does not necessarily imply the existence of a second or additional such feature or element

Having thus described the preferred embodiment of the invention, what is claimed as new and desired to be protected by Letters Patent includes the following:

1. A handling apparatus for handling cylindrical objects comprising:
   a base having a front and a back, a first side member and a second side member in parallel disposition to the first side member, and a cross member spanning between the first side member and the second side member, the front comprising ground engaging front wheels and the back comprising ground engaging back wheels;

a tube extending upwardly from the cross member, the tube having a first face;

a handle member extending upwardly from the tube the handle member comprising a first rail and a second rail, with an opening defined between the first rail and the second rail;

a slide bar having a portion thereof slidingly inserted into the tube, the slide bar further comprising an upward end extending outside of the tube, the slide bar having a second face;

an engagement bracket pivotally attached to the upward end of the slide bar, the engagement bracket comprising an openable circular band with a manually operated closure wherein the openable circular band has an open position, in which the cylindrical object may be placed within the circular band, and the circular band has a closed position, in which the manually operated closure is actuated and the circular band circumferentially grasps the cylindrical object;

wherein the engagement bracket is pivotal from a horizontal position to a non-horizontal position wherein, in the horizontal position, the circular band may receive the cylindrical object when the cylindrical object is standing in a vertical position upon a horizontal surface, and in the non-horizontal position, the cylindrical object is grasped within the circular band in the closed position and tilted away from the vertical position such that a portion of the cylindrical object is receivable within the opening defined between the first rail and the second rail; and a locking mechanism which selectively locks the slide bar into a locking engagement with the tube.

2. The apparatus of claim 1 wherein the second face comprises a plurality of spaced apart apertures in which, by the sliding of the slide bar within the tube, an aperture in the slide bar may align with the locking mechanism.

3. The apparatus of claim 2 wherein the locking mechanism comprises a pin assembly which attaches to the tube, the pin assembly comprising a pin which is insertable into any one of the plurality of spaced apart apertures in the second face.

4. The apparatus of claim 3 wherein the locking mechanism comprises a spring which biases the pin into a selected aperture from the plurality of spaced apart apertures.

5. The apparatus of claim 1 wherein the locking mechanism comprises an actuation lever for releasing the slide bar from a locking engagement with the tube.

6. The apparatus of claim 5 wherein the actuation lever comprises a foot lever.

7. The apparatus of claim 4 wherein the locking mechanism comprises an actuation lever which, upon activation, retracts the pin from the selected aperture.

8. The apparatus of claim 7 wherein the actuation lever comprises a foot lever.

9. The apparatus of claim 1 wherein the front wheels are articulating wheels and the back wheels are non-articulating wheels.

10. The apparatus of claim 1 wherein the tube comprises a first support member and a second support member and the and the first rail is inserted in the first support member and the second rail is inserted in the second support member.

11. The apparatus of claim 10 wherein the first rail member may be adjustably positioned within the first support member and selectively locked into a desired position and the second rail member may be adjustably positioned within the second support member and selectively locked into a desired position.

12. The apparatus of claim 1 wherein the openable circular band comprises a first arc member disposed in a general facing relation with a second arc member to generally define a circle, the first arc member and the second arc member each having a hinged end and a locking end, the first arc member and the second arc member hingedly connected at the hinge end and the locking end comprising the manually operated closure.

13. The apparatus of claim 1 wherein the base comprises a first unit and the vertical tube, slide bar, cylinder bracket, handle member, and locking mechanism comprise a second unit, and the second unit may be manually separated from the first unit and the second unit may be slidingly attached to a stationary stand and maintained in a standing position.

14. A method of moving a gas cylinder from a first position to a second position, the gas cylinder having a top and a bottom, the gas cylinder in a vertical orientation at the first position, with the bottom disposed on a horizontal surface, the method comprising the steps of:

engaging the gas cylinder with an engagement bracket of a handling apparatus, the handling apparatus comprising: (1) a base having ground engaging wheels, (2) a tube extending upwardly from the base, (3) a slide bar having a portion thereof slidingly inserted into the tube, the slide bar comprising an upward end extending outside of the tube, wherein the engagement bracket is pivotally attached to the upward end of the slide bar, the engagement bracket comprising an openable circular band with a manually operated closure wherein the openable circular band has an open position and a closed position, and (4) a handle member extending upwardly from the base, the handle member comprising a first rail and a second rail, with an opening defined there between;

positioning the openable circular band about the gas cylinder;

actuating the manually operated closure so the circular band circumferentially grasps the gas cylinder and locks around it;

pushing down on the top of the gas cylinder into the opening defined between the first rail and the second rail to raise the bottom from the horizontal surface;

moving the handling apparatus to the second position.

15. The method of claim 14 wherein the slide bar is selectively lockable at a plurality of positions within the tube.

16. The method of claim 14 wherein the second position comprises a horizontal storage shelf for placement of the gas cylinder, the method comprising the further steps of:

pushing down on the top of the gas cylinder thereby pivoting the engagement bracket until the gas cylinder is in an approximate horizontal position;

resting the bottom of the gas cylinder on a support member;

pushing the gas cylinder onto the horizontal storage shelf; and actuating the manually operated closure to release the cylindrical object from the circular band.

* * * * *